United States Patent [19]

Lemme et al.

[11] Patent Number: 4,556,934
[45] Date of Patent: Dec. 3, 1985

[54] SHAPE MEMORY METAL ACTUATOR

[75] Inventors: Charles D. Lemme; Tracy R. Lemme, both of Tucson, Ariz.

[73] Assignee: Blazer International Corp., Franklin Park, Ill.

[21] Appl. No.: 706,036

[22] Filed: Feb. 27, 1985

[51] Int. Cl.$^4$ ............................................. F03G 7/06
[52] U.S. Cl. .................................. 362/279; 362/325; 60/527; 337/140; 428/906
[58] Field of Search ................. 337/140; 60/527, 528, 60/529; 362/279, 325, 321, 374, 277; 148/402; 428/960; 411/909

[56] References Cited

U.S. PATENT DOCUMENTS

| 1,591,754 | 7/1926 | Gates | 362/279 |
|---|---|---|---|
| 2,846,543 | 8/1958 | Sivacek | 337/140 |
| 4,490,975 | 1/1985 | Yaeger et al. | 337/140 |
| 4,524,343 | 6/1985 | Morgan et al. | 337/140 |

FOREIGN PATENT DOCUMENTS 637132  4/1978  France ................. 362/279

OTHER PUBLICATIONS

Cooper, et al. Investigations of the Unique Memory Properties of 55-Nitinol Alloy, 1/1969; pp. 265-274.
Baker, The Shape-Memory Effect in a Titanium-35 wt. % Niobium Alloy, 1/1971, pp. 92-100.
Jackson et al., 55-Nitonol-The Alloy with a Memory: Its Physical Metallurgy, Properties, and Applications, 1/1972, pp. 1, 2 and 77-79.

Primary Examiner—Craig R. Feinberg
Assistant Examiner—David A. Okonsky
Attorney, Agent, or Firm—Willian Brinks Olds Hofer Gilson & Lione Ltd.

[57] ABSTRACT

A shape memory metal (SMM) actuator includes an SMM actuator element mounted to an end fitting. An end portion of the actuator element adjacent the end fitting is cold formed to a thickness no more than 40% of the original thickness of the actuator element. This cold formed region extends by about 5 times the diameter of the actuator element away from the end fitting. The cold formed end region remains in the austenitic state, and is therefore relatively hard and strong. For this reason, the tendency of the actuator element to break at the end fitting is reduced, even though the end fitting acts as a temperature sink and maintains the cold formed end region below the transition temperature of the SMM actuator element.

14 Claims, 8 Drawing Figures

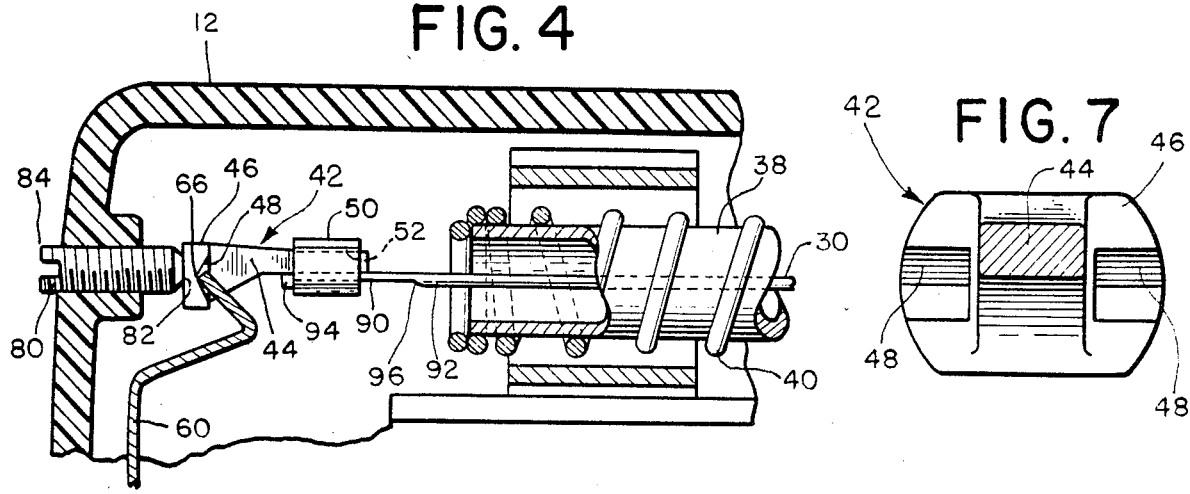
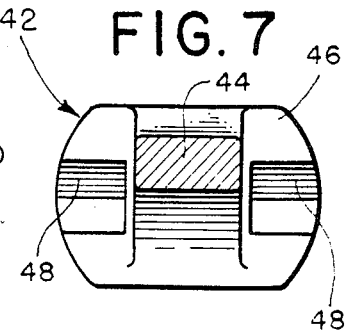
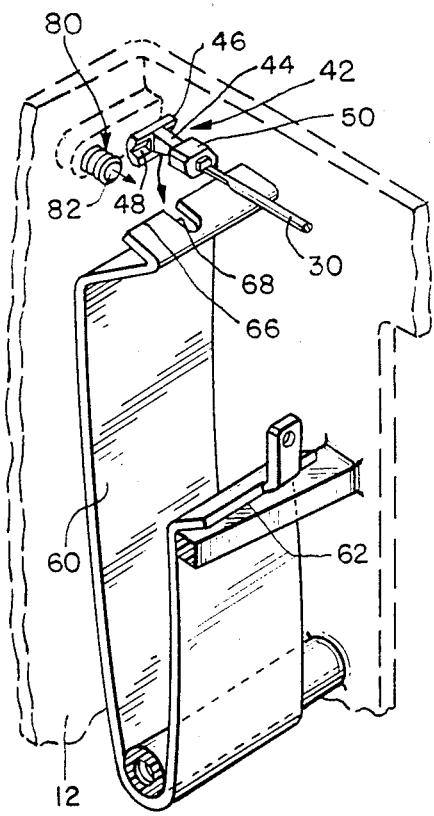
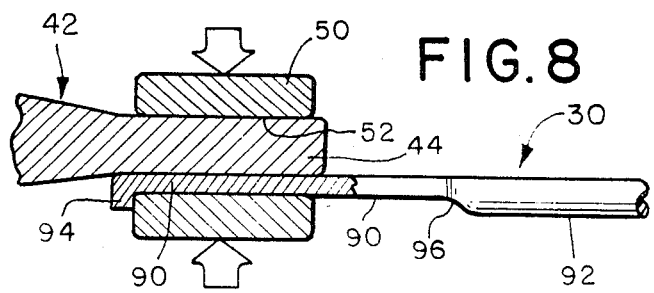
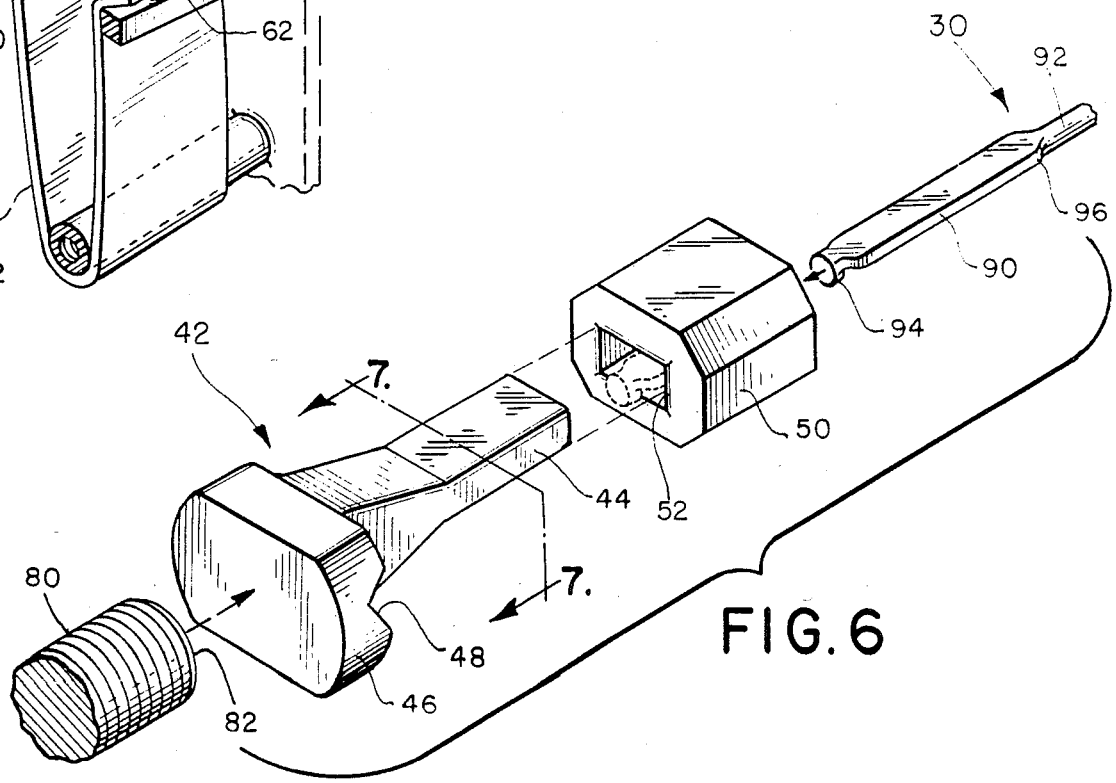

SHAPE MEMORY METAL ACTUATOR

BACKGROUND OF THE INVENTION

The present invention is directed to an improved shape memory metal (SMM) actuator which exhibits reduced tendency for the actuator element to break at the point of attachment to and end fitting.

In a SMM actuator a SMM wire is typically attached to an end fitting with compressive clamping forces. Such compressive clamping force radially compress the end fitting, plastically deforming a surrounding clamp onto the SMM wire. This approach produces a large, radially directed, compressive, residual contact pressure that bonds the SMM wire to the end fitting through friction. This approach brings with it two detrimental effects that limit the life of the SMM wire at the attachment point.

The first of these effects is an increased stress from two separate causes. The end fitting by necessity is larger than the SMM wire, and there is therefore a change in cross-section at the transistion from the wire to the end fitting. This discontinuity in cross-sectional size causes an increase in stress at the connection above the average stress level. In addition, the end fitting and the clamp must grip the SMM wire hard enough to prevent slippage, and this gripping induces local compressive stresses in the SMM wire above the average stress. The present invention is not addressed to this stress problem.

The second detrimental effect is due to the much larger thermal mass and increased thermal conductivity of the end fitting. Typically, this is due simply to the larger size of the end fitting. The result is that the SMM wire near the end fitting remains at a much lower temperature than the central portion of the SMM wire when the SMM wire is heated during routine temperature cycling. The relatively large end fitting acts as a heat sink to draw heat out of the SMM wire. This effect is only felt by the wire for a few diameters of length away from the end fitting. Typically, wire that is more than about five diameters away from the end fitting is unaffected by the heat sink properties of the end fitting.

As is well known, SMM wire has two states, separated only by temperature. When cool, the SMM wire is in the martensitic state, in which the wire is relatively soft and easily deformed. When warmed above a transition temperature the SMM wire is transformed into the austenitic state, in which the wire is much stronger and stiffer than when in the martensitic state. When in the martensitic state, the SMM wire is deformed under relatively low load. When heated through its transition temperature, the SMM wire remembers its original shape and tends to return to that shape. In the process, it builds up stresses that oppose the original deformation, and the SMM wire can do work while returning to its original shape. SMM actuators often use SMM wire in tension (straight sections of wire) of torsion (helical coils of wire). The SMM wire is deformed while cool. When actuation is required, the wire is heated to a temperature above the transition temperature, usually by passing an electrical current through it. Such an electrical current imparts energy into the wire, in the form of heat, equally along the length of the wire. However, the end fittings conduct heat out of the end portions of the SMM wire, so that these end portions of SMM wire always remain below the transition temperature, in the martensitic state. During actuation, the stresses in the SMM wire rise as the wire does work. Since the SMM wire near the end fittings is relatively weak in comparison to the center portion which is in the austenitic state, the relatively soft portions of the SMM wire near the end fittings tend to elongate more than the central section of the wire, thereby reducing the cross-sectional area of the SMM wire in these martensitic regions. Such reductions in cross-sectional area often lead to early failure of the SMM wire adjacent to the end fittings.

SUMMARY OF THE INVENTION

This invention is directed to an improved SMM actuator which includes an improved junction between the SMM wire and the end fitting to reduce the tendency of the SMM wire to break adjacent to the end fitting.

According to this invention, an SMM actuator of the type comprising an SMM actuator element secured to an end fitting is further provided with a cold formed portion of the actuator element in alignment with the end fitting and extending away from the end fitting. This cold formed portion is cold formed sufficiently to maintain the cold formed portion in a relatively hard, stiff state and to prevent state changes of the cold formed portion as the actuator element is temperature cycled in normal operation. In this way, breakage of the actuator element adjacent to the end fitting is reduced.

In the preferred embodiement described below, the cold working of the end portion of the actuator element is sufficient to transform the end portion into the relatively hard and strong austenitic state and to prevent the end portion from transforming to the martensitic state during normal temperature cycling of the actuator element. This permanently austenitic end portion of the actuator element extends sufficiently far from the end terminal so that the transition between the cold worked end portion and the adjacent portion of the actuator element is cycled in temperature in the normal manner. Thus, the austenitic end portion both provides a strong point of attachment to the end fitting and insures that the adjacent portion of the actuator element which enters the martensitic state is sufficiently spaced from the end fittings to by cycled in temperature in the normal manner.

The invention itself, together with further objects and attendant advantages, will best be understood by reference to the following detailed description, taken in conjunction with the accompanying drawings.

BRIEF DESCRIPTION OF THE DRAWINGS

FIG. 4 is an enlarged view taken in the plane of FIG. 2 of a portion of the actuator of FIG. 2.

FIG. 5 is an exploded perspective view of a portion of the actuator of FIG. 4.

FIG. 6 is an exploded perspective view of an end portion and an end fitting of the actuator of FIGS. 4 and 5.

FIG. 7 is a cross-sectional view taken along line 7—7 of FIG. 6.

FIG. 8 is a cross-sectional view showing a completed connection between an actuator element and an end fitting of the actuator of FIGS. 4 and 5.

DETAILED DESCRIPTION OF THE PRESENTLY PREFERRED EMBODIMENT

Figure 1:
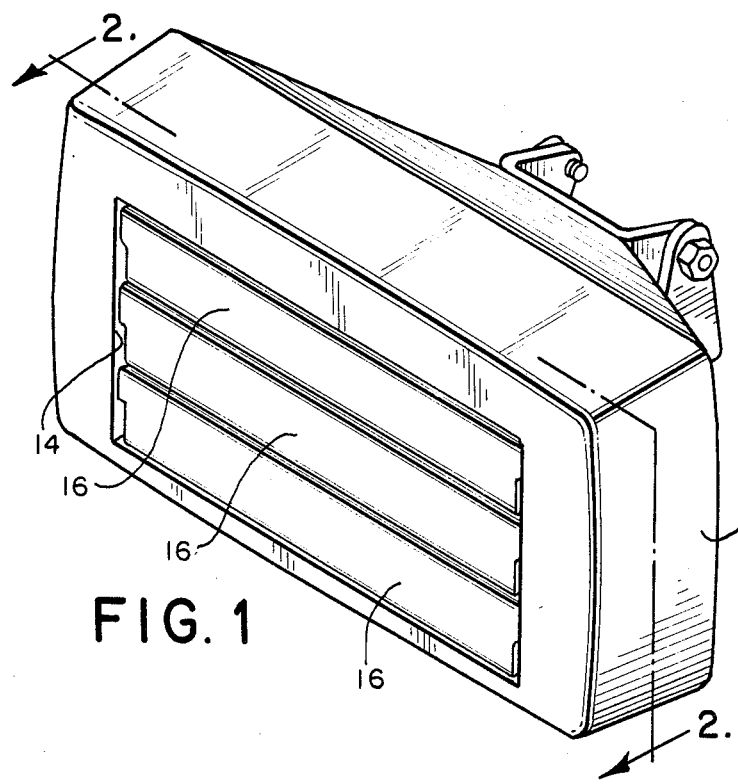
FIG. 1 is a perspective view of a louvered lamp which includes a presently preferred embodiment of the actuator of this invention.

Turning now to the drawings, reference numeral 10 refers to the presently preferred embodiment of the actuator of this invention. For purposes of illustration, the actuator 10 is shown connected to a louvered lamp.

Figure 3:
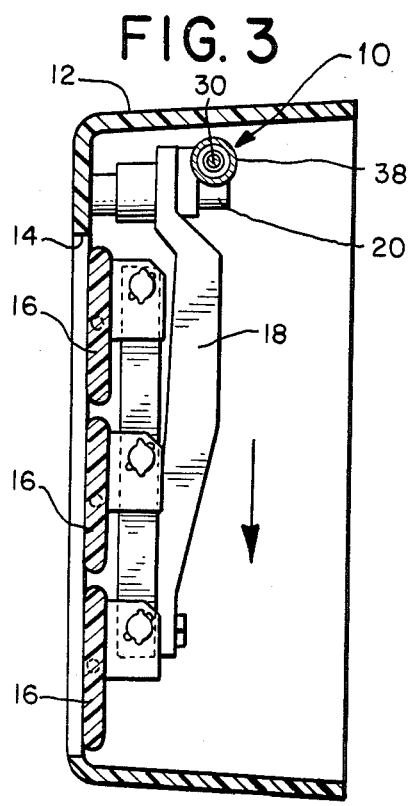
FIG. 3 is a cross-sectional view taken along line 3—3 of FIG. 2.
Figure 2:
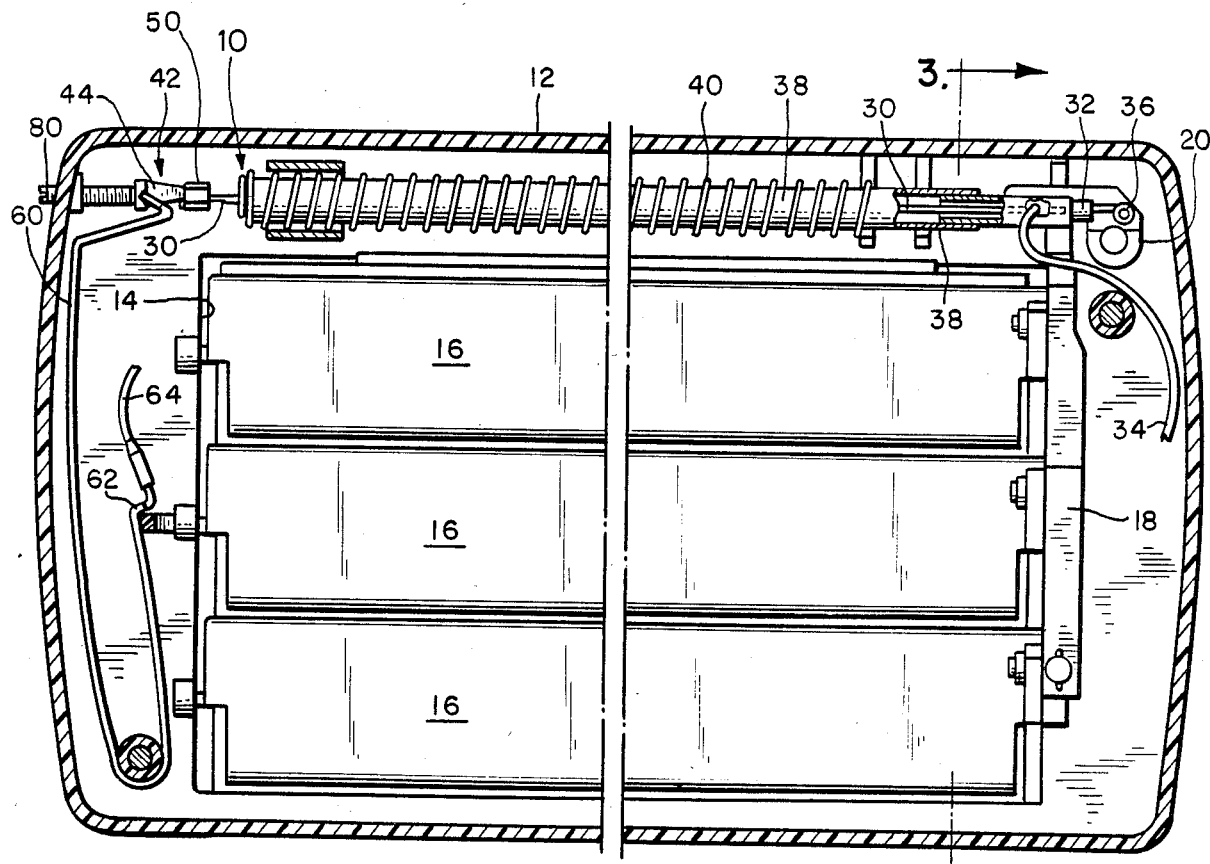
FIG. 2 is a cross-sectional view taken along line 2—2 of FIG. 1.

As shown in FIGS. 1-3, the actuator 10 is mounted within a lamp housing 12 which defines a lens opening 14. Several spaced louvers 16 are mounted to extend across the lens opening 14, and the louvers 16 are linked together by a cross bar 18. The cross bar 18 is in turn linked to a bell crank 20. The housing 12, louvers 16 and linkage 18,20 of this preferred embodiment are identical to those described in greater detail in a copending U.S. patent application Ser. No. 703,895, filed Feb. 21, 1985, entitled Automatic Takeup and Overload Protection Device for Shape Memory Actuator, and assigned to the assignee of this invention. This application is hereby incorporated by reference for its detailed description of the louver linkage.

The actuator 10 includes an actuator element 30 which in this embodiment is a straight length of an SMM wire such as Nitinol. This actuator element 30 is connected at one end to a first end fitting 32 which defines an eye 36 shaped to mount to the bell crank 20. The first end fitting 32 serves to mount an electrical lead 34 as well as a rigid metal tube 38 which is concentric with the actuator element 30. A return spring 40 is mounted around the exterior of the tube 38 to bias the tube 38 to the right as shown in FIG. 2, thereby biasing the louvers 16 to the closed position. The above-identified U.S. Patent application should be referenced for further details of the structure and operation of the actuator element 30 and the return spring 40.

As shown in FIGS. 4-7, the other end of the actuator element 30 is secured to a second end fitting 42 which defines a relatively narrow shank 44 and a relatively broader head 46. The head 46 defines two V-shaped grooves 48.

The actuator element 30 is secured to the first and second end fittings 32, 42 by respective clamps 50. In this embodiment, the clamps 50 each define central openings 52 and are formed of a material such die-cast zinc. The clamps 50 are crimped in place as shown in FIG. 8 in order to hold the first and second end fittings 32, 42 to respective ends of the actuator element 30.

An overload protection spring 60 which in this embodiment is a leaf spring 60 defines a fixed end 62 fixedly mounted to the housing 12. An electrical lead 64 is secured to this fixed end 52. The spring 60 also defines a free end 66 which defines a slot 68 sized to receive the shank 44. When assembled as shown in FIG. 4, the shank 44 is received in the slot 68 and the free end 66 is received in the groove 48 to engage the second end fitting 42 and therefore the actuator element 30 to the free end 66 of the overload protection spring 60.

An adjustment screw 80 is threadedly mounted to the housing 12. This adjustment screw 80 defines a slotted head 84, which is accessible from the exterior of the housing 12, and a stop surface 82. The adjustment screw 80 is positioned such that the overload protection spring 60 biases the head 46 of the second end fitting 42 into contact with the stop surface 82. Thus, the stop surface 82 defines the rest position of the second end fitting 42.

FIG. 6 shows an enlarged view of one of the ends of the actuator element 30 prior to attachment to the clamp 50. Preferably, the two ends of the actuator 30 are identical. As shown in this figure, the actuator element 30 defines a cold formed region 90 next to an adjacent region 92 of the actuator element 30. The extreme end 94 of the actuator element 30 is undeformed and retains the original shape. In this preferred embodiment, the undeformed shape of the actuator element 30 is a wire having a diameter of 0.5 mm. Thus, both the extreme end region 94 and the adjacent region 92 have a diameter of 0.5 mm. The cold formed region 90 has a thickness of 0.2 mm. The junction between the cold formed region 90 and the adjacent region 92 defines a transition zone 96 is smoothly radiused with a radius of curvature of 0.2 mm. In this embodiment, the clamp 50 is 3 mm in length, the cold formed region 90 is 5.5 mm in length, and therefore approximately 2.5 mm of the cold formed region 90 extends out of one end of the clamp 50 (FIG. 8). For this reason, the transition zone 96 is spaced from the clamp 50 by 2.5 mm, about five times the diameter of the adjacent region 92. In this embodiment the cold formed region 90 is formed in a single pressing operation with a hydraulic press. However, other cold forming methods are believed to be suitable as well.

SMM is transformed into the much harder and stronger austenitic state when it is severely cold worked. In particular, if an SMM wire is deformed to about 40% of its original diameter, the flattened portion is extremely strong and hard. In fact, in the presently preferred embodiment tungsten carbide anvils are used to cold work the SMM wire. When Nitinol is cold worked, high speed tool steel is indented by the SMM wire.

Since the cold formed region 90 is fully austenitic throughout the temperature cycling of the actuator element 30, it is of no consequence that the cold formed region 90 remains cool due to the heat sink characteristics of the end fitting 42. Because the cold formed region 90 remains in the austenitic state it retains sufficient strength and does not tend to elongate and break. Because the transition zone 96 is spaced from the clamp 50 by about five times the diameter of the actuator element 30, the transition zone 96 is heated above the transition temperature of the SMM wire during temperature cycling of the actuator element 30, thereby reducing the tendency of the actuator element 30 to fracture at the transition zone 96.

The transition zone 96 is provided with a gentle radius between the cold formed region 90 and the adjacent region 92 in order to minimize any increase in the average stress. The extreme end 94 is allowed to remain in the original round form so as to form an anchor point that will resist any tendency of the actuator element 30 to slip out of the clamp 50.

The overload protection spring 60 cooperates with the adjustment screw 80 to protect the actuator element 30 from excessive stresses and to provide ready adjustment of the rest position of the second end fitting 42. In this way, overall elongation of the actuator element 30 due to cyclic creep can be compensated for. In this preferred embodiment, the overload spring 60 biases the second fitting 42 against the stop surface 82 with an installed spring force of about 700 grams and a spring rate of about 180 grams/mm. In the event applied forces on the actuator element 30 exceed 700 grams, the overload spring 60 flexes, allowing the second end fitting 42 to move away from the adjustment screw 80. In this way, the actuator element 30 is protected from excessive stretching forces.

In effect, the adjustable screw 80 defines an adjustable rest position for the second end fitting 42 of the actuator element 30. When the length of the actuator element 30 increases during use due to cyclic creep, the adjustment screw 80 can be moved to take up the increased length of the actuator element 30. In this way, the effective stroke of the actuator element 30 is preserved, even in the face of cyclic creep.

Of course, it should be understood that a wide range of changes and modifications can be made to the preferred embodiment described above. For example, the actuator 10 can be used in a wide variety of settings in addition to the louvered lamp shown. Furthermore, the cold formed end region of the actuator element can be used in a wide variety of actuator elements, whether or not the actuator elements are mounted to end fittings with clamps. For example, adhesives such as epoxies and low temperature solders which do not anneal the actuator element may be used instead of clamps. It is therefore intended that the foregoing detailed description be regarded as illustrative rather than limiting, and that it be understood that it is the following claims, including all equivalents, which are intended to define the scope of this invention.

We claim:

1. In a shape memory metal actuator of the type comprising a shape memory metal actuator element secured to an end fitting, the improvement comprising:
    a cold formed portion of the actuator element in alignment with the end fitting and extending away from the end fitting, said cold formed portion being cold formed sufficiently to maintain the cold formed portion in a relatively hard, stiff state and to prevent state changes of the cold formed portion as the actuator element is temperature cycled in normal operation, thereby reducing breakage of the actuator element adjacent to the end fitting.

2. The invention of claim 1 wherein the cold formed portion remains in the austenitic state throughout temperature cycling of the actuator element.

3. The invention of claim 1 wherein the cold formed portion is reduced in thickness to no more than about 40% of its original thickness in a cold forming operation.

4. The invention of claim 1 wherein the actuator element is formed of a nickel-titanium alloy.

5. The invention of claim 1 wherein the actuator is mounted to a louvered lamp which comprises a housing which defines a lens opening and an array of louvers mounted to the housing to extend across the lens opening, and wherein the actuator is coupled to the louvers to control the position of the louvers.

6. The invention of claim 1 wherein the cold formed portion joins a remaining portion of the actuator element at a transition zone, wherein the cold formed portion contacts the end fitting in a heat sink zone, and wherein the transition zone is spaced from the heat sink zone sufficiently such that the transition zone is cycled in temperature with the remaining portion of the actuator element.

7. The invention of claim 1 wherein the actuator element is secured to the end fitting by a compression member which holds the actuator and the end fitting in frictional engagement.

8. The invention of claim 7 wherein the compression member comprises a metal sleeve.

9. The invention of claim 7 wherein the remaining portion of the element defines a diameter, wherein the cold formed portion joins a remaining portion of the actuator element at a transition zone, and wherein the cold worked portion of the actuator element extends away from the compression member by at least about five times the actuator element diameter such that the transition zone is cycled in temperature with the remaining portion of the actuator element.

10. In a shape memory actuator of the type comprising a shape memory actuator element having a selected minimum cross sectional dimension and an end fitting, the improvement comprising:
    a cold formed end region of the actuator element which defines a reduced cross sectional dimension no more than about 40% of the selected minimum cross sectional dimension; said end region having a selected length and joining an adjacent region of the actuator element at a transition zone; and
    a compression member shaped to hold the end region in frictional engagement with the end fitting;
    said selected length being sufficiently great to ensure that the transition zone cycles in temperature with the actuator element during normal operation of the actuator;
    said cold formed end region remaining constantly in an austenitic state during temperature cycling of the actuator element in normal operation of the actuator, thereby reducing breakage of the actuator element at the compression member.

11. The invention of claim 10 wherein the transition zone is spaced from the compression member by at least about five times the selected minimum cross sectional dimension.

12. The invention of claim 10 wherein the compression member comprises a crimped sleeve.

13. The invention of claim 10 wherein the actuator element is formed of a nickel-titanium alloy.

14. The invention of claim 10 wherein the actuator is mounted to a louvered lamp which comprises a housing which defines a lens opening and an array of louvers mounted to the housing to extend across the lens opening, and wherein the actuator is coupled to the louvers to control the position of the louvers.

* * * * *